US008065304B2

(12) United States Patent     (10) Patent No.:    US 8,065,304 B2
Ross                                                      (45) Date of Patent:    Nov. 22, 2011

(54) USING ASYMMETRIC MEMORY

(75) Inventor: Kenneth Andrew Ross, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 454 days.

(21) Appl. No.: 12/137,133

(22) Filed: Jun. 11, 2008

(65) Prior Publication Data

US 2009/0313418 A1    Dec. 17, 2009

(51) Int. Cl.
*G06F 17/30*     (2006.01)
(52) U.S. Cl. ........ 707/737; 707/739; 707/752; 707/824; 711/103; 711/104; 711/105
(58) Field of Classification Search .......... 711/103–105; 707/758, 796, 800, 999.204, 999.205
See application file for complete search history.

(56) References Cited

U.S. PATENT DOCUMENTS

| | | | |
|---|---|---|---|
| 6,282,605 B1 | 8/2001 | Moore | |
| 7,065,607 B2 * | 6/2006 | England et al. | 711/103 |
| 7,325,105 B2 * | 1/2008 | Hitotsui | 711/154 |
| 7,447,069 B1 * | 11/2008 | Harari et al. | 365/185.11 |
| 7,457,910 B2 * | 11/2008 | Chang et al. | 711/103 |
| 7,536,428 B2 * | 5/2009 | Erdogan et al. | 1/1 |
| 7,599,949 B1 * | 10/2009 | Plasek et al. | 1/1 |
| 7,669,003 B2 * | 2/2010 | Sinclair et al. | 711/103 |
| 2006/0253645 A1 * | 11/2006 | Lasser | 711/103 |
| 2007/0022261 A1 * | 1/2007 | Young | 711/157 |
| 2007/0061504 A1 | 3/2007 | Lee | |
| 2007/0189082 A1 | 8/2007 | Berenbaum et al. | |
| 2007/0233940 A1 * | 10/2007 | Chu | 711/103 |
| 2008/0109593 A1 * | 5/2008 | Karamcheti et al. | 711/103 |
| 2008/0109629 A1 * | 5/2008 | Karamcheti et al. | 711/170 |
| 2008/0177978 A1 * | 7/2008 | Karamcheti et al. | 711/206 |

FOREIGN PATENT DOCUMENTS

| | | |
|---|---|---|
| DE | 10128752 A1 | 12/2002 |
| EP | 0542156 A2 | 5/1993 |
| JP | 11144478 | 5/1999 |
| JP | 2004220644 | 8/2004 |

OTHER PUBLICATIONS

Wu et al., "An Efficient B-Tree Layer for Flash-Memory Storage Systems", ACM Transactions on Embedded Computing Systems, 2007, pp. 1-20. http://citeseer.ist.psu.edu/viewdoc/summary?doi=10.1.1.112.3142.
Lee et al., "Design of Flash-Based DBMS: An In-Page Logging Approach", SIGMOD 2007, 12 pages. http://citeseer.ist.psu.edu/viewdoc/summary?doi=10.1.1.109.2154.
Nath et al., "FlashDB: Dynamic Self-tuning Database for NAND Flash", ACM/IEEE IPSN, 2007, 10 pages. http://research.microsoft.com/pubs/70375/tr-2006-168.pdf.

* cited by examiner

*Primary Examiner* — Debbie Le
(74) *Attorney, Agent, or Firm* — Yee & Associates, P.C.; Preston J. Young

(57) ABSTRACT

In one illustrative embodiment, a computer implemented method using asymmetric memory management is provided. The computer implemented method receives a request, containing a search key, to access an array of records in the asymmetric memory, wherein the array has a sorted prefix portion and an unsorted append portion, the append portion alternatively comprising a linked-list, and responsive to a determination that the request is an insert request, inserts the record in the request in arrival order in the unsorted append portion to form a newly inserted record. Responsive to a determination that the newly inserted record completes the group of records, stores an index, in sorted order, for the group of records.

20 Claims, 6 Drawing Sheets

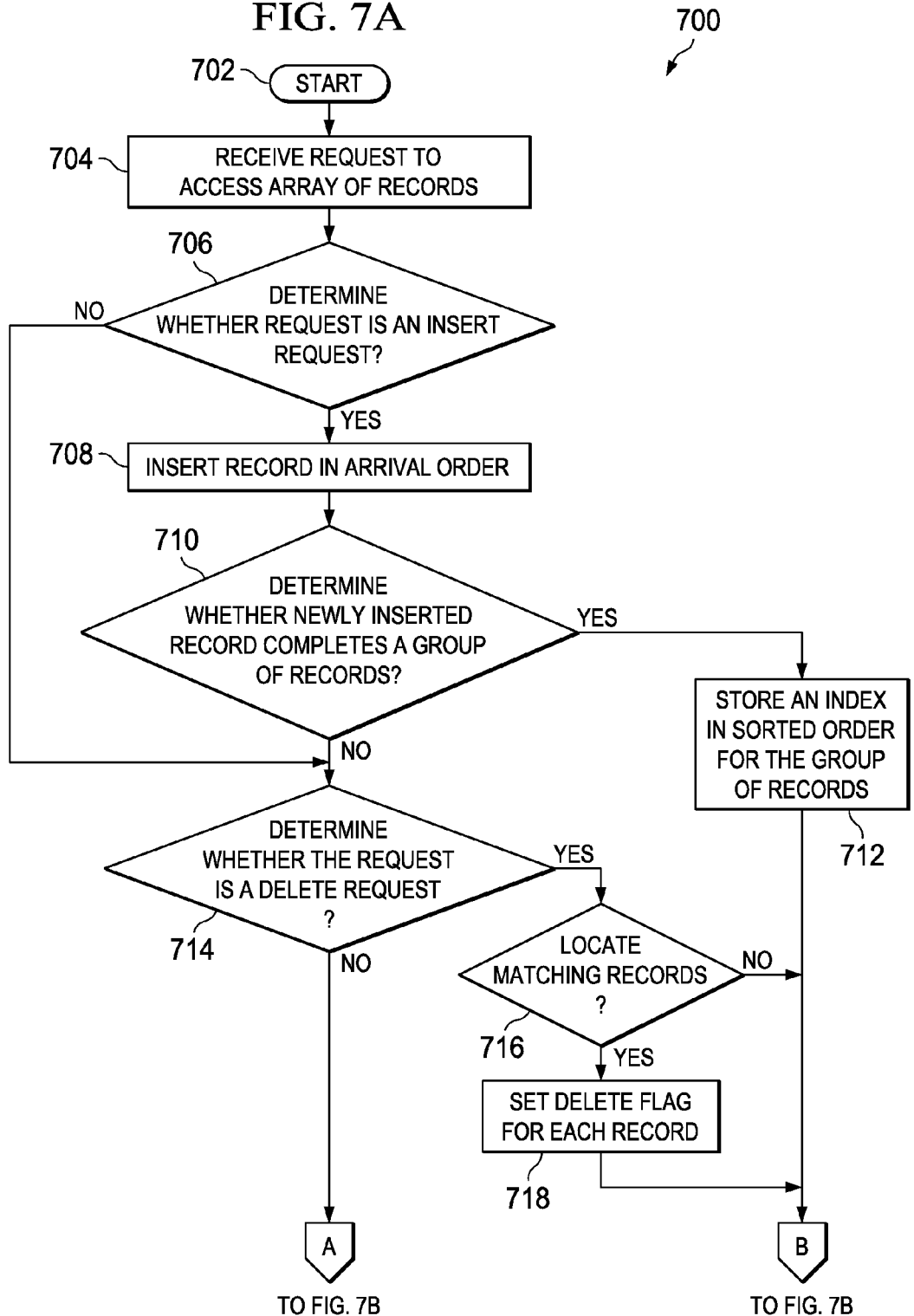

USING ASYMMETRIC MEMORY

BACKGROUND OF THE INVENTION

1. Field of the Invention

The present invention relates generally to an improved data processing system and, more specifically, to a computer implemented method, an apparatus, and a computer program product for using asymmetric memory.

2. Description of the Related Art

Solid state disks and other devices based on flash memory allow many more random input/output operations per second, up to two orders of magnitude more than conventional magnetic disks. Thus, they can, in principle, support workloads involving random input/output operations much more effectively.

However, flash memory cannot support general, in-place updates. Instead, a whole data page must be written to a new area of the device and the old page must be invalidated. Groups of contiguous pages form erase units and an invalidated page becomes writable again, only after the whole erase unit has been cleared. Erase times are relatively high, typically several milliseconds. Flash-based memory does, however, allow in-place changes of 1-bits to 0-bits without an erase cycle. Thus, it is possible to reserve a region of flash memory initialized to "all 1s" and incrementally use it in a write-once fashion.

When accounting for the costs of the various steps employed by an algorithm running on a flash memory, in addition to counting traditional algorithmic steps, one should count a page-write step whenever a write causes a 0 bit to change to a 1 bit. If an algorithm performs a group of local writes to a single page as one transactional step, the group is counted as a single page-write step. Even if only a few bytes are updated, a whole page must be written.

The true cost of a page-write step has several components. There is an immediate cost incurred because a full page must be copied to a new location, with the bits in question updated. If there are multiple updates to a single page from different transactional operations, the updates can be combined in random access memory and applied to the flash memory once. Care should be taken in such a scheme to guarantee data persistence, when that is an application requirement.

Also a deferred cost may be incurred because the flash device must eventually erase the erase unit containing the old page. The cost is deferred because the write itself does not have to wait for the erase to finish, and the erase can be performed asynchronously. Nevertheless, erase times are high and a device burdened by many erase operations may not be able to sustain good read and write performance. Further, in an input/output intensive workload, a steady state can be reached in which erasure cannot be performed fast enough, and writes have to wait for erased pages to become available.

An additional, longer-term cost of page erases in terms of device longevity is present. On current flash devices, an erase unit has a lifetime of about $10^5$ erases. Thus, if special-purpose algorithms reduce the number of erases needed by a factor of f, the expected lifetime of the device can increased, in principle, by a factor of f.

BRIEF SUMMARY OF THE INVENTION

According to one embodiment of the present invention, a computer implemented method for using asymmetric memory is provided. The computer implemented method receives a request containing a search key to access an array of records in the asymmetric memory, wherein the array has a sorted prefix portion and an unsorted append portion, and responsive to a determination that the request is an insert request, inserts the record in the request in arrival order in the unsorted append portion to form a newly inserted record. The computer implemented method determines whether the newly inserted record completes a group of records, and responsive to a determination that the newly inserted record completes the group of records, stores an index, in sorted order, for the group of records.

In another embodiment, a computer implemented method for using asymmetric memory is provided. The computer implemented method receives a request to access a set of records, stored in a linked-list, in the asymmetric memory, wherein the linked-list comprising an allocated portion and unallocated portion, wherein the unallocated portion is initialized to all 1s and determines whether the request is an insert request. Responsive to a determination that the request is an insert request, creates a node containing the inserted record in the unallocated portion, and updates the next node pointer in the last node of the list to point to the inserted record. The computer implemented method further determines whether the request is a delete request, and responsive to the determination that the request is a delete request, traverses the list to find the matching records, and setting a delete indicator for each matching record.

In yet another embodiment, a computer implemented method for using asymmetric memory is provided. The computer implemented method receives a request to access a counter, wherein the counter consists of a base value and a plurality of increment values, wherein each increment value is associated with a multiplier and determines whether the request is a read request, and responsive to the determination that the request is a read request, calculates the total value of the counter by multiplying the increment values by associated multipliers to form results and adding the results to the base value. The computer implemented method further determines whether the request is an update request containing an updating value to add to the counter, and responsive to the determination that the request is an update request, computes a combination of multipliers that sum to the updating value, and increments the increment values for each multiplier in the combination of multipliers.

BRIEF DESCRIPTION OF THE SEVERAL VIEWS OF THE DRAWINGS

FIGS. 7a and 7b are a flowchart of a process using the data structure of FIG. 6, in accordance with illustrative embodiments.

DETAILED DESCRIPTION OF THE INVENTION

Figure 1:
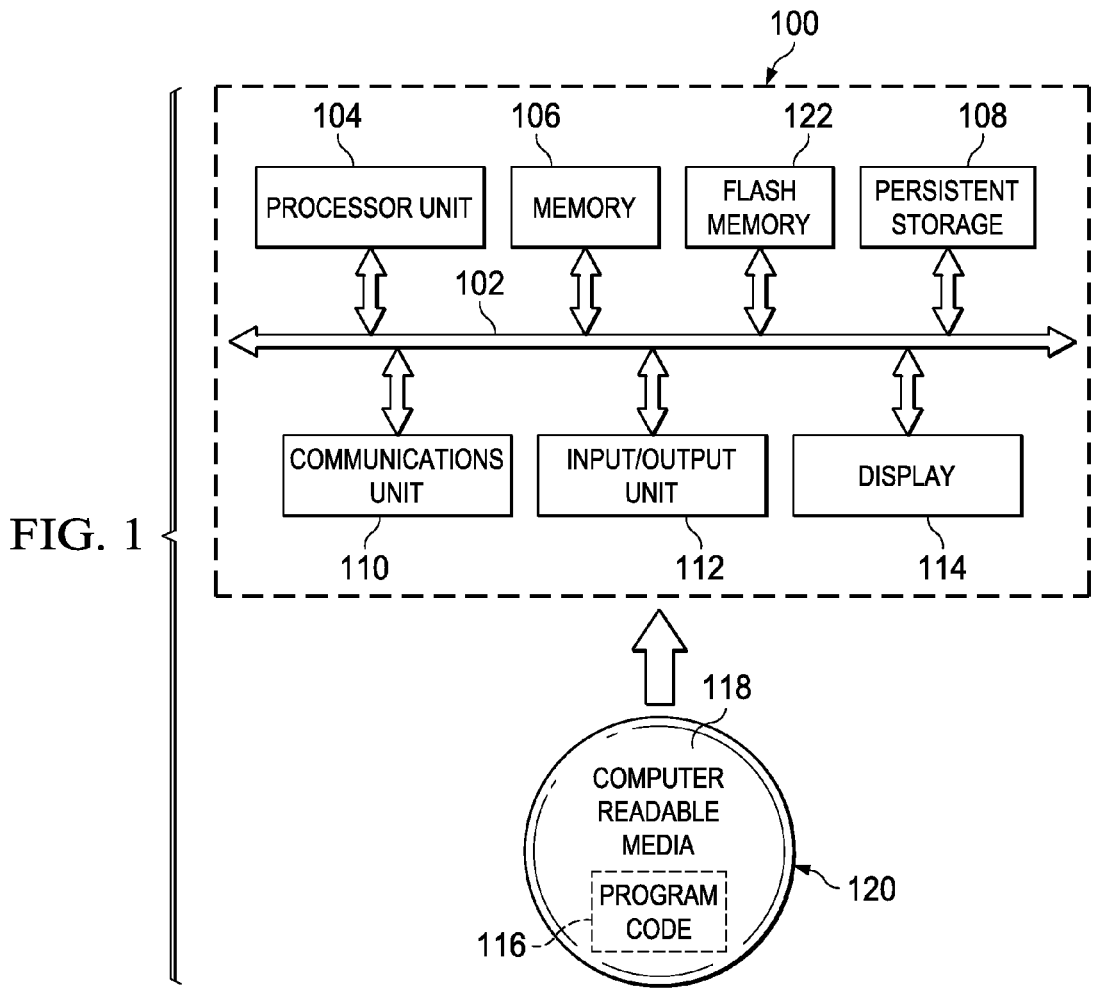
FIG. 1 depicts a block diagram of a data processing system in which illustrative embodiments of the present invention may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by, or in connection with, the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to, wireless, wire line, optical fiber cable, RF, etc.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN), or a wide area network (WAN), or the connection may be made to an external computer (for example, through the Internet using an Internet Service Provider).

The present invention is described below with reference to flowchart illustrations and/or block diagrams of methods, apparatus (systems), and computer program products, according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, or other programmable data processing apparatus, to function in a particular manner, such that the instructions stored in the computer-readable medium produce an article of manufacture including instruction means which implement the function/act specified in the flowchart and/or block diagram block or blocks.

The computer program instructions may also be loaded onto a computer, or other programmable data processing apparatus, to cause a series of operational steps to be performed on the computer, or other programmable apparatus, to produce a computer implemented process, such that the instructions which execute on the computer, or other programmable apparatus, provide processes for implementing the functions/acts specified in the flowchart and/or block diagram block or blocks.

With reference now to the figures, and in particular with reference to FIG. 1, exemplary diagrams of data processing environments are provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

FIG. 1 depicts a block diagram of a data processing system in which illustrative embodiments may be implemented. Data processing system 100 is an example of a computer, in which computer-usable program code or instructions implementing the processes may be located for the illustrative embodiments. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices. A storage device is any piece of hardware that is capable of storing information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable device, in the form of flash memory 122, may be used for persistent storage 108. Flash memory 122 is an example of memory providing connectivity and portability of applications or data.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer-usable program code, or computer-readable program code that may be read and executed by a processor in processor unit 104. The program code in the different embodiments may be embodied on different physical or tangible computer-readable media, such as memory 106 or persistent storage 108.

Program code 116 is located in a functional form on computer-readable media 118 that is selectively removable and may be loaded onto or transferred to data processing system 100 for execution by processor unit 104. Program code 116 and computer-readable media 118 form computer program product 120 in these examples. In one example, computer-readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer-readable media 118 also may take the form of a persistent storage, such as a hard drive, a thumb drive, or a flash memory that is connected to data processing system 100. The tangible form of computer-readable media 118 is also referred to as computer-recordable storage media. In some instances, computer-readable media 118 may not be removable.

Alternatively, program code 116 may be transferred to data processing system 100 from computer-readable media 118 through a communications link to communications unit 110 and/or through a connection to input/output unit 112. The communications link and/or the connection may be physical or wireless in the illustrative examples. The computer-readable media also may take the form of non-tangible media, such as communications links or wireless transmissions containing the program code. The different components illustrated for data processing system 100 are not meant to provide architectural limitations to the manner in which different embodiments may be implemented. The different illustrative embodiments may be implemented in a data processing system including components in addition to, or in place of, those illustrated for data processing system 100. Other components shown in FIG. 1 can be varied from the illustrative examples shown. As one example, a storage device in data processing system 100 is any hardware apparatus that may store data. Memory 106, persistent storage 108, and computer-readable media 118 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

The two basic types of flash memory available today, as may be implemented by flash memory 122, are NOR-flash and NAND-flash. These technologies have contrasting behaviors that make them suitable for different classes of application. For example, NAND-flash tends to have larger capacity, faster writes and erases, and page-level data access. NOR-flash tends to have faster reads and fine-grained random access to data. Hybrid NAND/NOR devices also exist.

Illustrative embodiments provide a capability to reduce the number of page-write steps required to perform various operations involving data stored in flash memory 122. In particular, general updates require a page-write to a new page, while updates of 1 bits to 0 bits can be performed in place. Illustrative embodiments provide flash-aware methods for counting, list-management, and B-trees. In accordance with illustrative embodiments, the incremental 1-to-0 update properties of flash memory 122 can be used to reduce the required number of page-write operations. For example, a counter used to track occurrences may be located in flash memory 122 for use with data or an application contained within flash memory 122, in accordance with illustrative embodiments. The counter is improved in accordance with illustrative embodiments to provide increments or decrements by an arbitrary amount. Using the improved counter allows the addition of a value to the counter while avoiding a page-write by decomposing the addition into a larger number of smaller increments. The unary counter increments may be set to an arbitrary value.

In another illustrative embodiment using a linked list, a page-write is avoided by updating a NULL pointer of "all 1s" using only 1-to-0 updates in the last element of the list to point to a new element. The new element is written into an area previously initialized to "all 1s."

The types of flash memory interaction allowed by a device vary. Some devices implement only a page-level application programming interface, such as flash translation layer (FTL), a specification available from Intel Corporation, and updates to pages always cause a new page to be written. Such a choice allows a solid state disk (SSD) device to resemble a magnetic disk device, and be used in existing systems that employ disk devices. Other devices, together with a software layer, expose flash as a memory technology device (MTD) via unsorted block images (UBI), which allows partial updates to pages.

Memory technology devices are a type of flash memory that consists of erase blocks rather than sectors, like in hard drives. Erase blocks are large in size, typically 32 kilobytes, or 128 kilobytes compared to hard drive's sector size of between 512 to 1024 bytes. Memory technology devices maintain three main operations of read from erase block, write to the erase block, and erase the erase block.

The method of unsorted block images is a type of volume management system for flash devices. Unsorted block images method manages more than one logical volume on a single physical flash device and spreads the input/output load, providing a form of wear-leveling across the scope of the flash memory device. In other disk technology, a logical volume manager maps logical sectors to physical sectors and the unsorted block images maps the logical erase blocks to the physical erase blocks and provides input/output error handling.

Low level flash interfaces have been defined by the Open NAND Flash Interface (ONFI) working group at www.onfi.org. A typical assumption is an interface in which partial writes to a page are allowed, as long as the writes only involve transitions from a "1 bit" to a "0 bit."

Some flash devices store error-correcting codes in reserved portions of the flash memory. Incremental changes to pages would also require incremental changes to the error-correcting codes. Even if the data changes are monotonic 1-to-0 writes, the resulting error-correcting code changes are unlikely to be monotonic. It may thus be necessary to reserve space for an array of error-correcting code values and to write a new element into the array after each write.

In an illustrative embodiment, a request may be received, by a memory manager in flash memory 122 of data processing system 100 of FIG. 1, containing a search key, to access an array of records also contained with flash memory 122. The array has a sorted prefix portion and an unsorted append portion. The method determines whether the request is one of an insert, delete or read request, and responsive to a determination that the request is an insert request, inserts a record in arrival order in the unsorted append portion to form a newly inserted record. The unsorted append portion is a part of the array having vacant space for the addition of new records. The space is typically at the end of the array after the end of the prefix portion. The new records take space from the unused but allocated space of the append portion. These records are unsorted meaning they are added in the order in which they arrive and are not otherwise sequenced in a defined order. For example if records having key field values for age of 13, 18 and 7 were to be inserted into the unsorted append portion they would be placed in the order of 13, 18 and 17 without regard for the key field values.

Figure 2:
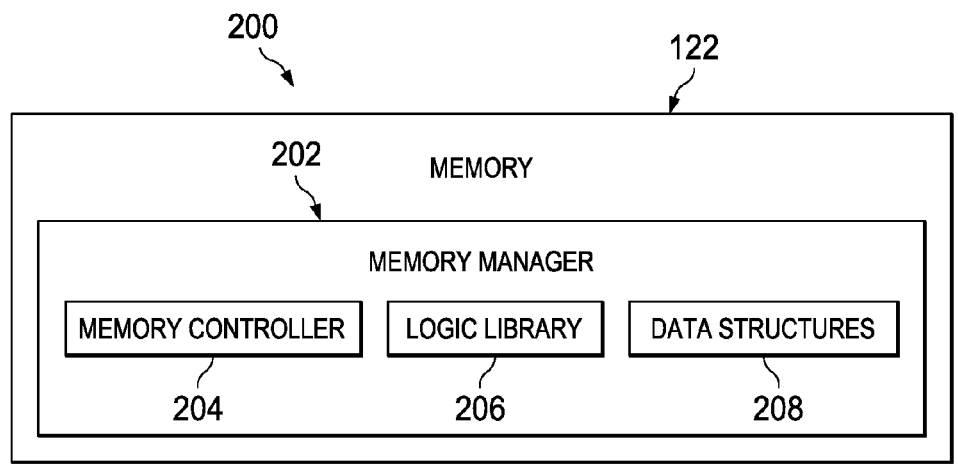
FIG. 2 is a block diagram of components of a memory manager in accordance with illustrative embodiments.

The method further determines whether the newly inserted record completes a group of records, and responsive to a determination that the newly inserted record completes the group of records, stores an index, in sorted order, for the group of records. The computer implemented method further determines whether the request is a delete request, and responsive to a determination that the request is a delete request, locates the record and sets a delete flag bit for the record. The method further determines whether the request is a read request, and responsive to a determination that the request is a read request, locates and retrieves the records with a key matching a search key. The method determines whether a delete flag bit is set for the retrieved records, and returns those records for which the delete flag is not set With reference to FIG. 2, a block diagram of components of a memory manager in accordance with illustrative embodiments is shown. Memory manager 202 is shown within flash memory 122 of system 100 of FIG. 1. Other locations may provide a location for memory manager 202, such as within persistent storage 108 or memory 106 of FIG. 1 until memory management services, in accordance with illustrative embodiments, are required.

Memory manager 202 is comprised of a number of modules or components including, memory controller 204, logic library 206, and data structures 208. For ease of installation, use and maintenance, the components are collected under the interface provided by the memory manager 202.

Memory controller 204 provides the operational control over the services of memory manager 202. Memory controller 204 provides the capability to select and initiate a particular memory module from logic library 206. Data structures 208 is provided to meet the needs of the logic being used. For example, when a link-list support is needed, an implementation supporting the particular needs of the link-list data structure is chosen to provide desired results.

Logic library 206 provides a selection of capabilities tailored to support specific implementations. For example, logic may be selectively provided to allow support for counters, linked-lists and B-tree types of implementations. Logic provided defines the operational capability of the methods in reusable code. Implementations may offer the function in a granular modular manner of packaging, pluggable components, or monolithic installation.

Data structures 208 supports algorithms encoded in logic library 206. For example, B-tree support may be provided through a specific data structure defining storage areas for keys, record identifiers, indexes, and other elements used in the context of B-trees. In a similar manner, support for specific counter layouts and linked-lists may also be provided. When a particular logic selection requires a corresponding data structure, the needed support data structure would be placed within data structures 208.

Erase units for flash devices are typically large, around 128 kilobytes (KB). Copying a full erase unit on every update would not be efficient. A common practice may be for data copying to occur in page-sized units, where the page size P depends on how the device is configured. A typical value of P might be 2 kilobytes, meaning 64 pages are contained within a 128 kilobyte erase unit.

A device may provide a memory mapping layer that maps logical page addresses to physical page addresses. Such mapping is commonly implemented in hardware within page-granularity devices. When a data update happens, the physical address changes, but the logical address remains the same so that updates do not need to be propagated to data structures that refer to the data page. The mapping layer also ensures that wear on the device is shared among physical pages because flash pages have a limited lifetime of approximately $10^5$ erase cycles. The mapping layer may also hide faulty or worn-out pages from the operating system. In a preferred embodiment, a logical-to-physical mapping layer is present. In an alternative embodiment, when the device itself does not provide such a layer, such a layer could be implemented in software.

Through use of illustrative embodiments, results of algorithms running on data residing in flash memory are shown. In a typical flash memory, a 0-to-1 transition requires that a whole erase unit be set to "1 bits," while a 1-to-0 transition can be performed simply, in place. The algorithms may also be useful for data residing in other kinds of asymmetric memory, in which the cost of a 1-to-0 transition is different from the cost of a 0-to-1 transition, including memories for which it is the 1-to-0 transition that is more expensive. The algorithms may be executed by a controller that could be, for example, a computer or a solid state electronic device. The algorithms may be implemented in hardware, in software, or partly in hardware and partly in software.

A distinction can be made between situations where the input/output device is saturated, and where the device is lightly loaded. Algorithm support may also include a low priority background process that asynchronously traverses data structure elements and reorganizes the data structure elements to improve performance. The extra input/output workload will not typically be noticeable in a lightly loaded setting, and most data structure elements will typically be in an optimized state. In a saturated or near-saturated scenario however, the background process will rarely run, and the data structure elements will remain in a non-optimized state.

Figure 3:
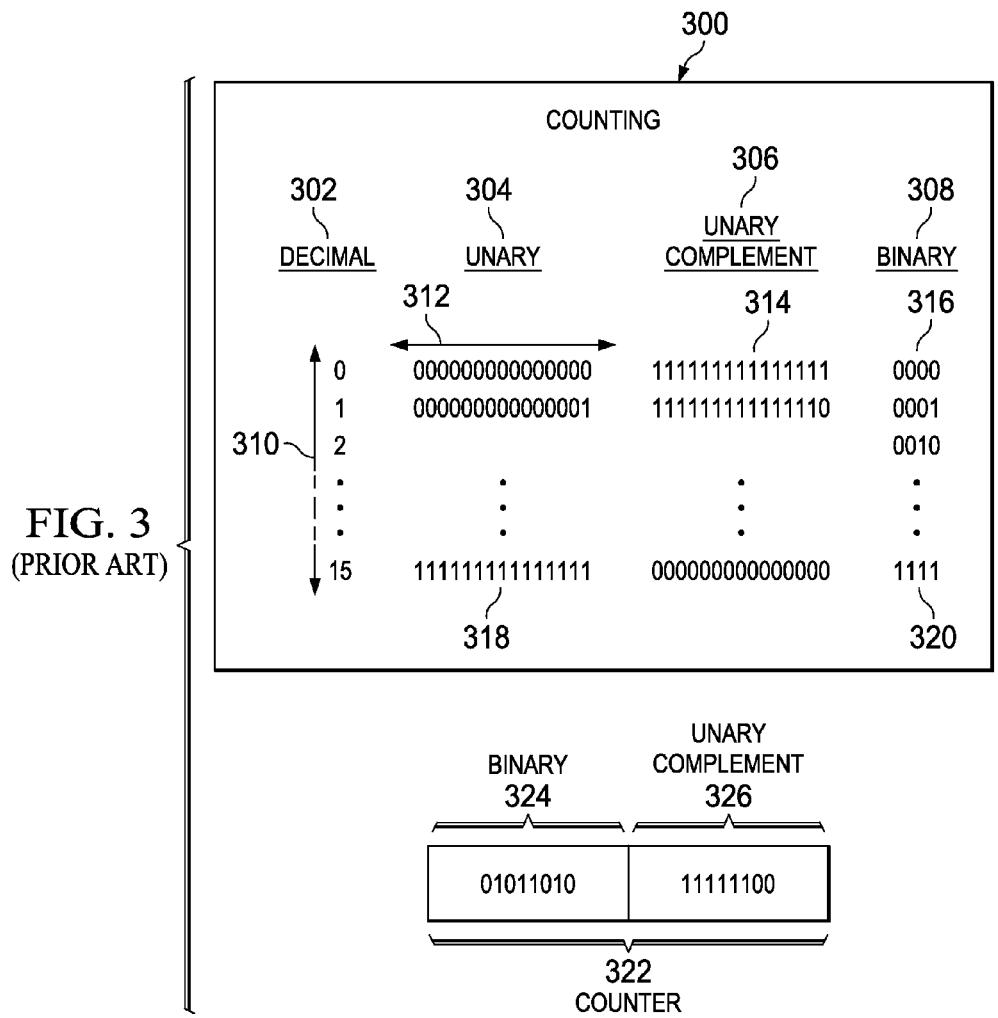
FIG. 3 is a block diagram of unary, binary and decimal-based counting methods and a combination binary and unary counter.

With regard to FIG. 3, a block diagram of unary, binary, and decimal-based counting methods and a combination binary and unary counter is shown. Counting 300 provides an example of a relationship between the decimal, unary, unary complement, and binary counting models. For example, decimal element 302 defines a column of decimal-based numbers from "0" to "15." Range 310 defines the scope of the counting example for a total of 16 entries.

Unary element 304 defines a corresponding set of numbers in the unary numbering style. Range 312 shows a "width" of 15 places for the number representing a decimal "0." In a similar manner, element 318 shows the unary representation of the decimal number "15" as having "all 1s" for 15 places. The unary style requires a digit for each element of the count desired, therefore occupying considerably more space than either the decimal or binary systems. The increment between elements is one unit.

Unary complement 306 is the opposite of unary element 304; each 1 digit in the unary representation is replaced by a 0, and each 0 digit is replaced by a 1. The unary complement representation is sometimes convenient when using memories in which a change from a 1 to a 0 is easier than to change a 0 to a 1. Unary complement element 314 shows the unary complementary value of "0" in unary element 312 as "all 1s"

Binary element 308 defines a column of entries in the binary representation corresponding to the previous entries in the decimal and unary systems. The value of decimal "0" may be seen as "0000" in binary representation of element 316. Four places are required to contain the values from "0" to "15," comprising 16 possible entries. Element 316 shows the corresponding binary entry for "0" as "0000" while element 320 shows the entry for decimal 15 as being "1111." In this example, the increment between elements is a power of 2.

FIG. 3 also shows a prior combination binary and unary counter. Counter 322 incorporates two counting styles. The positioning of the counting style on the left or right side does not matter. Binary portion 324 is large enough to contain the value expected of the counter. In a similar manner, unary complement portion 326 must be large enough to handle the largest entry being counted before spilling into binary portion 324. The value is represented as a total of the binary and unary values. In the example of counter 322, the value is equal to 90+2=92, since the binary value is 90, and the unary complement value is 2.

In the prior scheme of counter 322 of FIG. 3, the unary counter portion has a fixed length L, and the counter fits in a page. The counter is computed during a look-up by adding the base counter to the offset of the first zero in the unary complement array, which can be found using a binary search. A page-write is then needed every L steps, at which time the binary base counter is recomputed and the unary counter is reset to be "all 1" bits.

Figure 4:
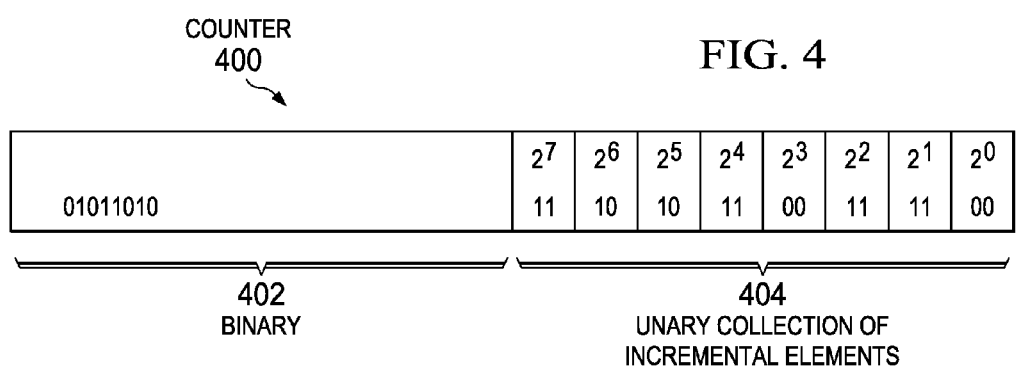
FIG. 4 is a block diagram of a combination binary and unary counter, in accordance with illustrative embodiments.

With reference to FIG. 4, a block diagram of a combination binary and unary counter, in accordance with illustrative embodiments is shown. Counter 400 contains binary portion 402 and a collection of unary complement incremental elements 404. The binary portion is similar to binary 324 of counter 322 of FIG. 3. Collection of unary complement incremental elements 404 contains a set of selective incremental elements. The incremental elements are designed to contain counter elements of a selectable, specific count interval. For example, in FIG. 4, each incremental element in collection of unary complement incremental elements 404 is defined to be a power of 2. Changing the increment value provides an opportunity to increment by a larger amount in less space.

The prior scheme of counter 322, of FIG. 3, is thus generalized to handle situations where increments, or decrements, by arbitrary amounts are possible. A single base counter, binary portion 402, is maintained in binary form. Collection of unary complement incremental elements 404 records increments, for example, by multiples of $2^0$, $2^1$, $2^2$, etc. The powers of two shown in elements 404 are for descriptive purpose only and would not be present, as such, in an implementation of an embodiment. An increment is broken down into its binary form, and the corresponding unary complement counters are updated. A similar but separate set of counters may also be maintained for decrements. Read operations need to scan through the various counters to compute the net change to the binary stored value. For example, the counter 400 in FIG. 4 has a value $90+2^6+2^5+2\times2^3+2\times2^0=204$.

In the event that one of the unary complement incremental elements is full, it may still be possible to process an addition without a page-write by decomposing the addition into a larger number of smaller increments. For example, if the unary complement incremental elements corresponding to $2^5$ is full; the value $2^5$ could be added by appending two bits to the unary complement incremental elements corresponding to $2^4$.

Other configurations are also possible. For example, instead of recording increments using a unary counter for each power of 2, unary counters for powers of an arbitrary value k may be used. The number of bits to set for each counter would be determined by the corresponding digit of the value to be added when written in base-k notation.

Figure 5:
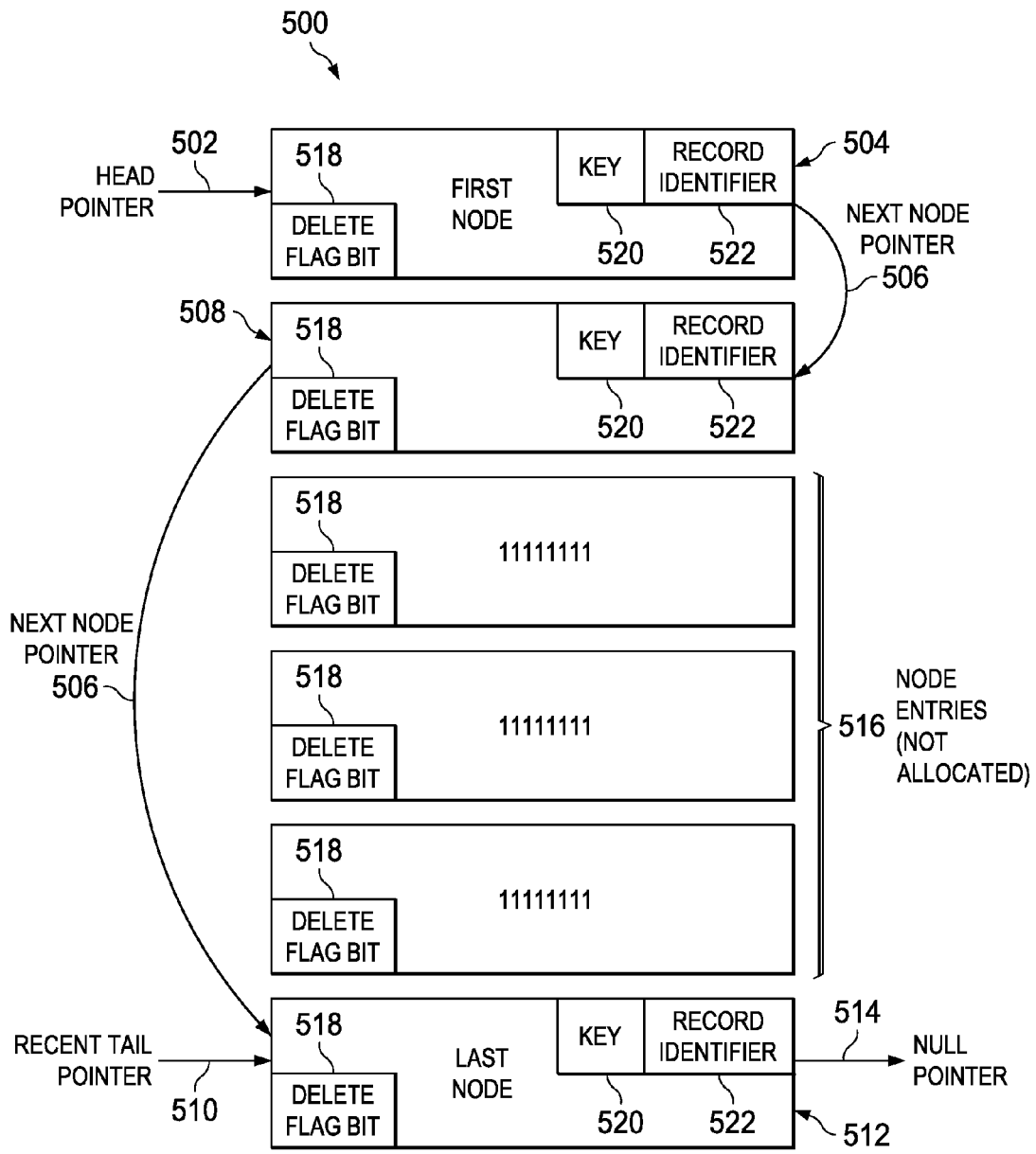
FIG. 5 is a block diagram of a data structure incorporating a linked-list, in accordance with illustrative embodiments.

With reference to FIG. 5, a block diagram of a data structure incorporating a linked-list, in accordance with illustrative embodiments is shown. Linked-list 500, in accordance with illustrative embodiments is an example of one of the data structures supported in data structures 208 of FIG. 2. A linked-list is a commonly used data structure. In a conventional linked-list implementation, a page-write would be needed to keep track of the tail of the list, to implement list element deletion, to insert an element into the list, and to update nodes within the linked listSuppose the "all-1 bit" pattern is interpreted as a NULL pointer. An append operation can then be performed to the list using only 1-to-0 updates by updating the NULL pointer in the last element of the list to become a pointer to a new element. The new element itself would be written in an area of the page initialized to "all-1s," but not currently used. Unlike traditional append operations to a list, this variant would need to first traverse the entire list. On the other hand, a page-write is avoided.

Deletions would also need to be handled in an indirect way, such as by using a delete flag within the node structure. Use of the additional lookup of the delete flags would complicate list traversal slightly because deleted nodes would remain in the list and need to have the flags checked. A low-priority background process can be used to clean the lists on a page and write a new page. In the new page, the deleted elements would be omitted. One could also store a shortcut to the current tail so that future append operations do not have to start from the head of the list.

In the example data structure representation, linked-list 500 depicts a number of elements within the structure. Head pointer 502 represents a pointer to $1^{st}$ node 504 in linked-list 500. Each node contains a triplet of a value, a delete flag bit, and a next node pointer. The value is composed of a record value and record identifier 522. The record value may contain entries for a set of fields of the record. The record typically contains key field 520 used to aid in searching records and other fields as needed depending upon the information content. For example a record is assigned a record identifier when created, such as "001." A key field may be assigned an attribute of "age." A search based on a predefined age will then return all records having the specified age in the key field and for each record, identifiers unique to each record. Next node pointer 506 in $1^{st}$ node 504 points to next node 508, with successive nodes continuing in the same manner to form a chain. Next node 508 has next node pointer 506 pointing to last node 512. Last node 512 is pointed to by recent tail pointer 510. Last node 512 also has a pointer. In this case, last node 512 contains NULL pointer 514, indicating no further node entries are available. Node entries 516 have been initialized with delete flag bit 518 and data values of "all 1s, indicating allocated, but unused nodes.

Recent tail pointer 510 is maintained in a reserved area of the data structure. The pointer provides a shortcut to the location of the last entry in the linked-list of elements at the time of the most recent page-write. The shortcut may be used to speed the lookup of the last entry prior to adding a new entry. A new entry is added by creating a new node in a pre-allocated space containing "all 1" bits. The next-pointer of the last element in the list, which is a NULL, is updated to now point to this new node.

When delete flag bit 518 is set for an element, or node, the element should be ignored during a read operation. The marked entry will be omitted during a refresh operation, in which a new version of the linked-list is written using a page-write operation.

Figure 6:
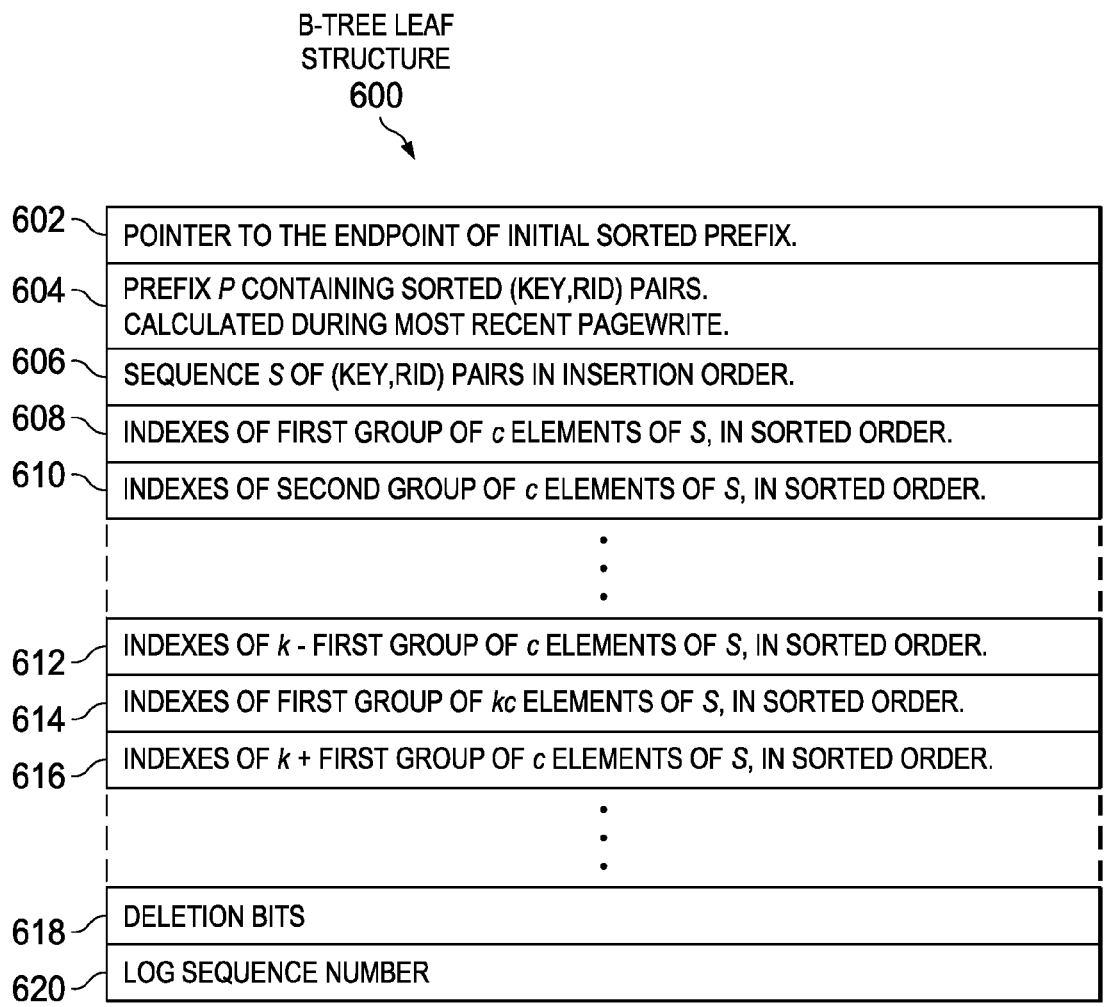
FIG. 6 is a textual representation of a data structure of a B-tree implementation in accordance with illustrative embodiment.

With reference to FIG. 6, a textual representation of a data structure of a B-tree leaf node implementation in accordance with illustrative embodiments is shown. The proposed method uses conventional B-tree methods for non-leaf nodes, which are well known in the art and therefore not described. Within a database system, one of the places where random input/output occurs frequently is in accessing B-tree indexes. B-tree leaf structure 600 is a data that records pairs of keys 520 and record identifiers (RIDs) 522 of FIG. 5, within a particular key range.

Implementations of B-trees on flash devices use random access memory to batch updates to flash-resident data pages. When the locality of reference of database access is poor, such as when the table and/or index is much bigger than the available random access memory, and records are being accessed randomly, there will be little opportunity for batching multiple updates into a single page-write. As a result, one might expect to incur the cost of a page-write for essentially every insertion, deletion, or update.

A new way to organize leaf nodes in a B-tree to avoid the page-write cost most of the time, while still processing updates one at a time, is proposed. Focus is on leaf nodes because that is where, typically, a large majority of changes happen. Suppose that an entry in a leaf node consists of an 8-byte key and an 8-byte record identifier (RID) referencing the indexed record. Assume a leaf node can hold L entries, taking 16L bytes. Further, assume that a leaf node has a size that exactly matches the page size of the device. With the requirement that leaf nodes be at least half full, a conventional B-tree leaf node will contain between L/2 and L entries stored in sorted key order. The ordering property allows for keys to be searched in logarithmic time using binary search.

In a previous scheme for a page-write-friendly leaf node, all entries are typically stored in an append-only array of the B-tree, in the order of insertion. A bitmap would be kept to mark deleted entries. When the node becomes full, the node is split, and non-deleted entries are divided among the two resulting pages. A drawback of this approach is typically that the search time within the node is linear rather than logarithmic, dramatically slowing searches and updates.

Apart from the initial root node, all leaf nodes are created as a result of a split. When a split happens, sorting the non-deleted records into key order is performed, and the records are stored in prefix area 604. The endpoint of this array is tracked by storing pointer 602 to the endpoint explicitly in the leaf node. Subsequent insertions are then appended to array 606 in insertion order sequence in an unsorted append portion.

Performance may have improved slightly because a binary search may be performed over at least half of the entries, followed by a linear search of the remaining entries to find a key. However, the asymptotic complexity is still linear in the size of the array.

To speed up the search of the newly-inserted elements, additional information is stored. Choose positive integer constants c and k. For every group of c new insertions into the unsorted segment of the array, store a c-element index array starting with array 608. Each entry in this index array stores an offset into the segment of new insertions, and the index array is created and stored in key order. The index array is not maintained incrementally. The index array is generated each time there have been a predefined number of c new insertions, forming a second or subsequent group, such as array 610.

While the record insertions have been performed in arrival sequence the index has been created in key sequence. The index therefore provides the capability to refer to the inserted records in key sequence order.

The method is applied recursively, as indicated by indexes 612, 614 and 616. Suppose that after completing a group of exactly kc elements, instead of a c-element offset array, now store a kc-element offset array covering the previous kc newly inserted records. Now, at most, there is one linear search needed of at most c−1 elements, at most k−1 binary searches of c elements, and m/kc binary searches of kc elements. If the scaling is continued of the offset array, each time m crosses c, kc, $k^2c$, $k^3c$ etc., then the total cost is $O(\log^2 m)$. There are $O(\log m)$ binary searches, each taking $O(\log m)$ time.

A complete search, therefore, takes $O(\log(n/L)+\log^2 L)=O(\log n+\log^2 L)$ time, where n is the number of elements in the tree. The space overhead of this approach is the total size of the index arrays. This size is $O(m \log m)$.

The overhead for one node is thus $O(L \log L)$, and the overhead for the entire tree is $O(n \log L)$. This is a classical computer-science trade-off in which more space is used to reduce the time overhead. Different choices for c and k represent alternative points in the space-time trade-off.

In practice, the space overhead is unlikely to be onerous. For example, suppose that the page size is 16 kilobytes, and 8 kilobytes can be devoted to new entries and the offset arrays. This places an upper bound of 512 new entries. If c is set to a value of 32 and k is set to a value of 3, the largest index array to build will have 288 entries. Assume one byte offsets for up to 255 elements and two-byte offsets for 256 or more elements. Based on these numbers, 446 new entries could be stored in the leaf node before space was exhausted. The space overhead is 1056 bytes out of 16 kilobytes, or approximately 6.4 percent, ignoring the requirements for a pointer to the start of the new elements 602 and the bits to record deletions 618.

Under lightly-loaded conditions, where spare cycles to do background leaf optimization are available, a leaf node may be converted to a sorted format and the pointers reset to new entries, writing the resulting node to a new memory location. For such "fresh" leaf nodes, search time is reduced from $O(\log^2 m)$ time to $O(\log m)$ time. Note that because of the logical-to-physical page mapping, parent nodes are unchanged by leaf freshening.

For every c entries, an updating transaction needs to sort c elements costing $O(c \log c)$ time. When the system gets to a $k^i c$-byte boundary, the system only needs to sort the last c elements, then merge k ordered lists of size $k^{i-1}c$, which can be done in $O(c \log c + k^i c \log k)$ time. Amortizing over all insertions, the cost per insertion is approximately $\log(m/c)$. Similarly, split processing can merge the array segments rather than fully sorting the array.

The end of the array of new values needs to be known in order to decide when to terminate the search, and where to append new values. A simple way to determine the end of the array of new values is to assume that a pattern of "all 1-bits" is not a valid key and record identifier pair. A binary search may be performed to find the last valid pair. In an alternative approach, the offset using counter 400 of FIG. 4, previously described, could also be explicitly stored to point to the last valid pair.

An assumption has been made that leaf nodes contain key and record identifier pairs. Sometimes, to save space, B-tree leaf nodes are designed to associate a key with a list of record identifiers. The proposed structure can be modified so that at the time of reorganization, for example, when a page-write occurs, the initial segment of data is in the key and record identifier list form. An alternative may be to keep a linked-list of record identifiers for each key, using the techniques of linked-list 500 of FIG. 5, described previously.

In B-tree implementations, a leaf node may contain a data structure. The data structure further contains a log sequence number (LSN) 620, recording information relevant for node recovery necessary after a failure. Log sequence number 620 could be implemented using a generalized counter, such as counter 400 of FIG. 4, described previously. Note that log sequence numbers are monotonically increasing, meaning that only increments, and not decrements, need to be considered.

A final structure of a B-tree node is thus summarized in FIG. 6. FIG. 6 shows a node containing combinations of key and record identifier pairs. If the record identifier lists were used, a region within the page would be used as a heap for allocating new record identifier nodes to add to the record identifier lists.

Figure 7B:
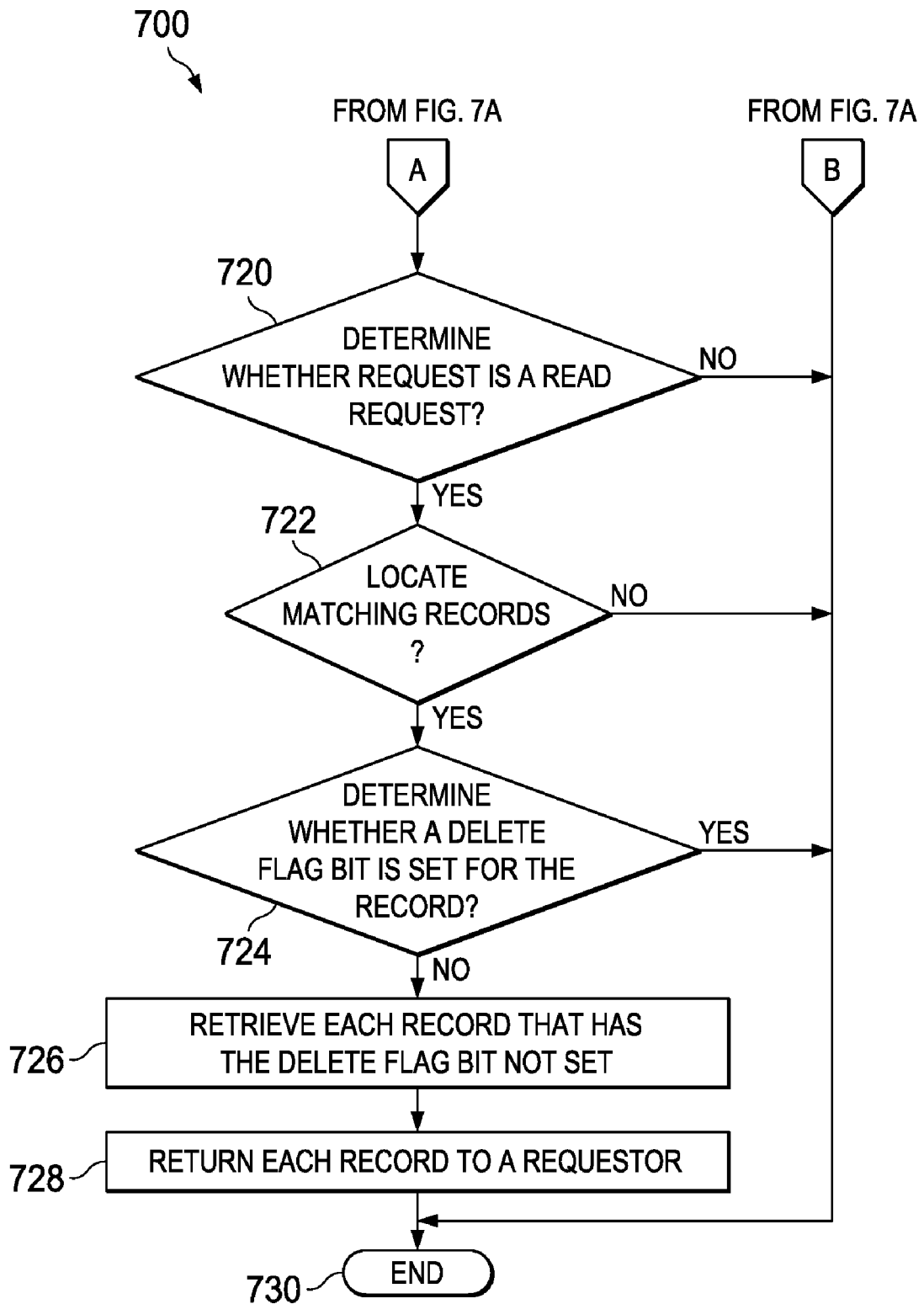

With reference to FIGS. 7a and 7b, a flowchart of a process using the data structure of FIG. 6, in accordance with illustrative embodiments is shown. Process 700 is an example of use of memory manager 202 of FIG. 2, in combination with data structure 600 of FIG. 6.

Process 700 starts (step 702) with receiving a request to access an array of records (step 704). The access request is one of an insert, delete, or read operation. A determination is made whether the request is an insert request (step 706). If the request is an insert, a "yes" is obtained. If the request is not an insert request, a "no" is obtained. When a "no" is obtained in step 706, process 700 skips ahead to step 714. When a yes is obtained step 706, an insert records in arrival order operation places the newly added records into a storage area of the data structure (step 708). The storage area is within an unsorted append portion of the array.

A determination is made as to whether the record completes a group of records (step 710). If the record is determined to complete the group, a "yes" is obtained. If the record does not complete the group, a "no" is obtained. When a "yes" is obtained in step 710, an index for the group is created and stored in sorted order (step 712). Each record, in the arrival sequence of records for the group, has a referring entry in the created index. The entries in the index are in key order to reduce search time to reference each record. When the index storing of step 712 is complete, process 700 terminates thereafter (step 730).

In an alternative embodiment, each record contained within a group of records may be placed in a linked-list of records. Each record placed in the linked-list is removed from the array, as it is now located in the linked-list. The array is now left with a pointer to the head of the linked list containing the group of records. For example, a record contains a key field of age and the age value for a number of records is 27, all records having the same age may be re-located into a linked-list. An entry remains in the array pointing to the head, or first entry, of the linked-list, from which the other records may be located.

When a "no" is obtained in step 710, a determination is made as to whether the request is a delete request (step 714). If the request is a delete request, a "yes" results in step 714. If the request is not a delete request, a "no" is obtained in step 714. When a "yes" is obtained in step 714, locate matching records is performed to determine if there are matching records (step 716). Matching of records may be performed using a search key in which the search key contains portions of the record such as fields within the record. Search criteria may use a search key or a field identifier or a combination. The field identifier may also include a value setting. When a determination is made that there are matching records, a "yes" is obtained. When a determination is made that there are no matching records, a "no" results. When a "no" is obtained in step 716, process 700 terminates (step 730). When a "yes" is obtained in step 716, a setting of a delete indicator, such as, a delete flag bit, or other suitable unique identifier, for each record to be deleted is performed (step 718) and process 700 terminates thereafter (step 730).

When a "no" is obtained in step 714, a determination is made as to whether the request is a read request (step 720). If the request is a read request, a "yes" results. If the request is not a read request, a "no" result is obtained. When a "yes" is obtained in step 720, a determination is made whether the search key of the request matches one or more record keys (step 722). If the search key matches the record key, a "yes" results. If the search key does not match any record key, a "no" result is obtained. When a "no" result is obtained in step 722, process 700 terminates thereafter (step 730). When a "yes" is obtained in step 722, a determination is made as to whether a delete flag bit is set for the records (step 724).

When a delete flag bit is set for the record, indicating a record marked for deletion, a "yes" is obtained in step 724. When no delete flag bit is set, a "no" is obtained in step 724. When a "yes" is obtained in step 724, the record will be ignored by the read request and process 700 terminates thereafter (step 730). Records that have been flagged for deletion may be removed, perhaps by a background operation, later by a page write of a clean process. When a "no" is obtained in step 724, a retrieve each record operation is performed (step 726). Each record that does not have the delete flag set is retrieved in step 726. Each retrieved record is returned to the requester (step 728) and process 700 terminates thereafter (step 730).

A log sequence number may be maintained to track the delete and insert operation counts. A counter 400 of FIG. 4 may be implemented to maintain a count of such events as necessary.

Illustrative embodiments provide a capability to reduce the number of page writes required during insert and delete operation using asymmetric memory. The reduction in page writes is due to the use of the characteristics of the technology to replace ones with zeros to avoid a write operation. The illustrative embodiments present a tradeoff of space for increased operating efficiency.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose, hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention, the practical application, and to enable others of ordinary skill in the art to understand the invention for various embodiments with various modifications, as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by, or in connection with, a computer or any instruction execution system. For the purposes of this description, a computer-usable or computer-readable medium can be any tangible apparatus that can contain, store, communicate, propagate, or transport the program for use by, or in connection with, the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for using asymmetric memory, the computer implemented method comprising:
   receiving a request, containing a search key, to access an array of records in the asymmetric memory, wherein the array has a sorted prefix portion and an unsorted append portion;
   responsive to the request being an insert request, inserting a record in the request in arrival order in the unsorted append portion to form a newly inserted record;
   determining whether the newly inserted record completes a group of records; and
   responsive to a determination that the newly inserted record completes the group of records, storing an index, in sorted order, for the group of records.

2. The computer implemented method of claim 1 further comprising:
   determining whether the request is a delete request containing zero or more record fields to be matched;
   responsive to a determination that the request is a delete request, locating all records matching the delete request search key and record fields;
   setting a delete indicator for the record;
   determining whether the request is a read request;
   responsive to a determination that the request is a read request, locating each record matching the request search key;
   determining whether the delete indicator is set for the record;
   responsive to a determination that the delete indicator is not set, retrieving the record; and
   returning the retrieved record.

3. The computer implemented method of claim 1 further comprising:
   updating a data structure, wherein the data structure contains a log sequence number;

receiving a request to access a counter of the log sequence number, wherein the counter consists of a base value and a plurality of increment values, wherein each increment value is associated with a multiplier;

determining whether the request is a read request;

responsive to the determination that the request is a read request, calculating the total value of the counter by multiplying the increment values by associated multipliers to form results and adding the results to the base value;

determining whether the request is an update request containing an updating value to add to the counter;

responsive to the determination that the request is an update request, computing a combination of multipliers that sum to the updating value; and incrementing the increment values for each multiplier in the combination of multipliers.

4. The computer implemented method of claim 3, wherein updating the data structure further comprises:

refreshing the counter by resetting the base value equal to a value of the counter, and resetting the plurality of unary complement increment values to zero.

5. The computer implemented method of claim 1, wherein determining whether the record completes a group further comprises:

determining whether a number of records in the unsorted portion of the array of records is within a set of threshold values.

6. The computer implemented method of claim 1, wherein locating the record further comprises:

searching the sorted prefix portion, and searching the unsorted append portion using the available index arrays, wherein the prefix portion comprises entries of sorted key and record identifier pairs, and the unsorted append portion comprises sequences of key and record identifier pairs in arrival order and indexes for groupings of the records within the unsorted append portion.

7. The computer implemented method of claim 1 further comprises:

creating a linked-list of records, wherein the linked-list associates each record within the group of records having the same key; and replacing a group of records, comprising the linked list, in the array of records with a pointer to a head of the linked-list.

8. A computer implemented method for using asymmetric memory, the computer implemented method comprising:

receiving a request, to access a set of records, stored in a linked-list, in the asymmetric memory, wherein the linked-list comprising an allocated portion and unallocated portion, wherein the unallocated portion is initialized to all 1s;

determining whether the request is an insert request;

responsive to a determination that the request is an insert request, creating a node containing the inserted record in the unallocated portion;

updating the next node pointer in the last node of the list to point to the inserted record;

determining whether the request is a delete request; and responsive to the determination that the request is a delete request, traversing the list to find the matching records, and setting a delete indicator for each matching record.

9. The computer implemented method of claim 8, further comprising:

determining whether the request is a read request;

responsive to a determination that the request is a read request, traversing the list to locate and retrieve each record;

determining whether a delete indicator is set for the record; and responsive to a determination that the delete indicator is not set, returning the retrieved record.

10. The computer implemented method of claim 8, further comprising:

cleaning a page, to exclude records having the delete indicator is set, in a low-priority background process, and writing a new page containing the cleaned list.

11. The computer implemented method of claim 8, wherein traversing the list to locate and retrieve each record further comprises:

matching of records with search criteria of the request, wherein the search criteria contains one of a search key, a portion of a record and a combination of the search key and the portion of the record.

12. A computer implemented method for using asymmetric memory, the computer implemented method comprising:

receiving a request to access a counter, wherein the counter consists of a base value and a plurality of increment values, wherein each increment value is associated with a multiplier;

determining whether the request is a read request;

responsive to the determination that the request is a read request, calculating the total value of the counter by multiplying the increment values by associated multipliers to form results and adding the results to the base value;

determining whether the request is an update request containing an updating value to add to the counter;

responsive to the determination that the request is an update request, computing a combination of multipliers that sum to the updating value; and incrementing the increment values for each multiplier in the combination of multipliers.

13. The computer implemented method of claim 12, further comprises:

refreshing the counter by resetting the base value equal to a value of the counter, and resetting the plurality of unary complement increment values to zero.

14. A data processing system for using asymmetric memory, the data processing system comprising:

a bus;

a memory connected to the bus, the memory comprising computer-executable instructions;

a communications unit connected to the bus;

a processor unit connected to the bus, wherein the processor unit executes the computer-executable instructions to direct the data processing system to:

update a data structure containing a counter;

receive a request to access the counter, wherein the counter consists of a base value and a plurality of increment values, wherein each increment value is associated with a multiplier;

determine whether the request is a read request;

responsive to the determination that the request is a read request, calculate the total value of the counter by multiplying the increment values by associated multipliers to form results and add the results to the base value;

determine whether the request is an update request containing an update value to add to the counter;

responsive to the determination that the request is an update request, computing a combination of multipliers that sum to the update value; and increment the increment values for each multiplier in the combination of multipliers.

15. The data processing system of claim 14, wherein the processor unit executes the computer-executable instructions to direct the data processing system to:

refresh the counter by resetting the base value equal to a value of the counter, and resetting the plurality of unary complement increment values to zero.

16. A data processing system for using asymmetric memory, the data processing system comprising:

a bus;

a memory connected to the bus, the memory comprising computer-executable instructions;

a communications unit connected to the bus;

a processor unit connected to the bus, wherein the processor unit executes the computer-executable instructions to direct the data processing system to:

receive a request, to access a set of records, stored in a linked-list, in the asymmetric memory, wherein the linked-list comprising an allocated portion and unallocated portion, wherein the unallocated portion is initialized to all 1s;

determine whether the request is an insert request;

responsive to a determination that the request is an insert request, create a node containing the inserted record in the unallocated portion;

update the next node pointer in the last node of the list to point to the inserted record;

determine whether the request is a delete request; and responsive to the determination that the request is a delete request, traverse the list to find the matching records, and setting a delete indicator for each matching record.

17. The data processing system of claim 16, wherein the processor unit further executes the computer-executable instructions to direct the data processing system to:

determine whether the request is a read request;

responsive to a determination that the request is a read request, traverse the list to locate and retrieve each record;

determine whether a delete indicator is set for the record; and responsive to a determination that the delete indicator is not set, return the retrieved record.

18. A data processing system for using asymmetric memory, the data processing system comprising:

a bus;

a memory connected to the bus, the memory comprising computer-executable instructions;

a communications unit connected to the bus;

a processor unit connected to the bus, wherein the processor unit executes the computer-executable instructions to direct the data processing system to:

receive a request, containing a search key, to access an array of records in the asymmetric memory, wherein the array has a sorted prefix portion and an unsorted append portion;

responsive to the request being an insert request, inserting a record in the request in arrival order in the unsorted append portion to form a newly inserted record;

determine whether the newly inserted record completes a group of records;

responsive to a determination that the newly inserted record completes the group of records, store an index, in sorted order, for the group of records.

19. The data processing system of claim 18 further comprises the processor unit executes the computer-executable instructions to direct the data processing system to:

determine whether the request is a delete request containing zero or more record fields to be matched;

responsive to a determination that the request is a delete request, locate all records matching the delete request search key and record fields;

set a delete indicator for the record;

determine whether the request is a read request;

responsive to a determination that the request is a read request, locate each record matching the request search key;

determine whether a delete indicator is set for the record;

responsive to a determination that the delete indicator is not set, retrieve the record; and return the retrieved record.

20. The computer implemented method of claim 18 further comprises the processor unit executes the computer-executable instructions to direct the data processing system to:

update a data structure, wherein the data structure contains a log sequence number;

receive a request to access a counter of the log sequence number, wherein the counter consists of a base value and a plurality of increment values, wherein each increment value is associated with a multiplier;

determine whether the request is a read request;

responsive to the determination that the request is a read request, calculate the total value of the counter by multiplying the increment values by associated multipliers to form results and adding the results to the base value;

determine whether the request is an update request containing an updating value to add to the counter;

responsive to the determination that the request is an update request, compute a combination of multipliers that sum to the updating value; and increment the increment values for each multiplier in the combination of multipliers.

* * * * *